United States Patent [19]
Muldoon et al.

[11] Patent Number: 5,950,753
[45] Date of Patent: Sep. 14, 1999

[54] VEHICLE HOOD LOUVERS WATER MANAGEMENT SYSTEM

[75] Inventors: Patrick J. Muldoon, Adrian; Michael D. Frakes, Lake Angeles; Robert B. Hutter; Eric P. Thorne, both of Livonia; Alexander N. Nassar, Canton, all of Mich.

[73] Assignee: Chrysler Corporation, Auburn Hills, Mich.

[21] Appl. No.: 08/891,905

[22] Filed: Jul. 14, 1997

[51] Int. Cl.$^6$ ..................................................... B60K 13/00
[52] U.S. Cl. ...................... 180/68.1; 180/69.2; 180/69.25
[58] Field of Search ................... 180/68.1, 68.2, 180/68.3, 69.2, 69.25; 98/2, 2.17, 121.1; 123/41.56, 41.7

[56] References Cited

U.S. PATENT DOCUMENTS

| | | |
|---|---|---|
| 4,646,884 | 3/1987 | Racchi .................................. 180/69.22 |
| 4,850,444 | 7/1989 | Bojanowski et al. .................. 180/68.1 |
| 5,129,473 | 7/1992 | Boyer ..................................... 180/68.1 |

Primary Examiner—Richard M. Camby
Attorney, Agent, or Firm—James R. Yee

[57] ABSTRACT

A water management system for venting hot air out of the engine compartment of a vehicle through the hood of the vehicle includes a louver cover positioned over vent holes in the hood. A gasket is sandwiched between the louver cover and the hood. A water tray is positioned under the hood and is bolted to the louver cover. The water tray includes an open edge that is juxtaposed with a trough in the fender of the vehicle and a barrier wall opposite the open edge. The barrier wall is slightly vertically distanced from the hood, such that hot air from the engine compartment can flow over the barrier wall and out of the vent holes, but water seeping into the vent holes is blocked by the barrier wall from entering the engine compartment, and must instead flow into the fender trough.

16 Claims, 3 Drawing Sheets

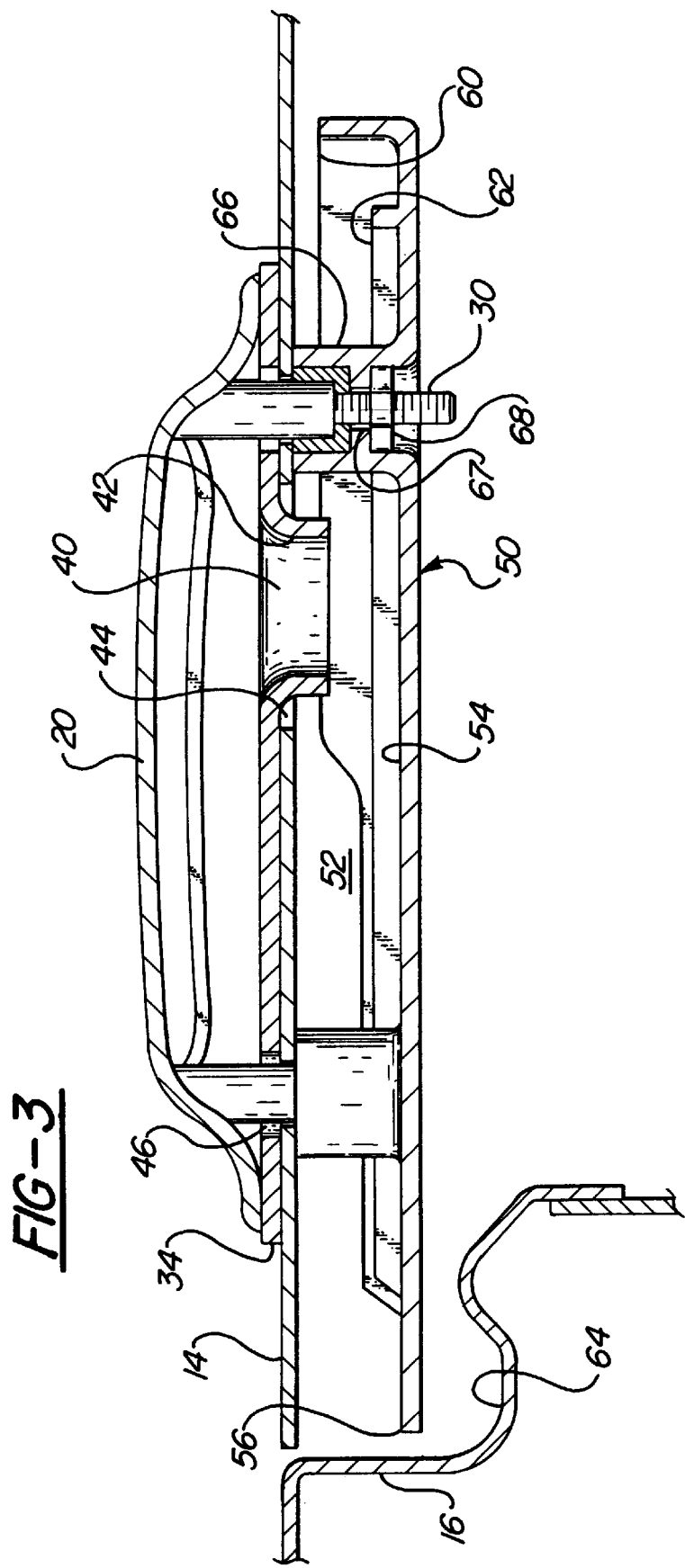

VEHICLE HOOD LOUVERS WATER MANAGEMENT SYSTEM

FIELD OF THE INVENTION

The present invention relates generally to vehicle engine cooling, and more particularly to systems for venting hot air from an engine compartment of a vehicle.

BACKGROUND OF THE INVENTION

Vehicle engines generate significant heat that is radiated into the engine compartments of the vehicles. It is desirable to provide a means for venting hot air from an engine compartment to prolong the life of the engine and various components within the engine compartment. For example, in many modern vehicles, electronic components that are related to computerized vehicle control systems are mounted in the engine compartment, and these components are preferably maintained at temperatures that are not. excessively high.

It happens that with the advent of modern laser cutting devices, vent holes can relatively easily be made in metal body parts, such as the hood of a vehicle, after the hood has been formed and indeed after the hood has been assembled onto the vehicle. Then, louvers can be installed over the vent holes. Hot air can vent upwards through the engine compartment and vent holes and out of the louvers, and cooler air from beneath the engine compartment can then replace the vented hot air, to thereby cool, to some extent, the engine compartment during operation.

It further happens, however, that despite the existence of the louvers, water can nevertheless seep into the engine compartment through the vent holes. This is undesirable, particularly when, as mentioned above, relatively sophisticated electronic components are housed within the engine compartment. As recognized by the present invention, such water seepage can damage the electronic components and thereby partially frustrate the purpose of the vent holes in prolonging equipment life.

Accordingly, it is an object of the present invention to provide a system for permitting hot air to vent from an engine compartment of a vehicle, while substantially preventing water from seeping into the engine compartment. Another object of the present invention is to provide a system for permitting hot air to vent from an engine compartment of a vehicle, without allowing water to enter the vehicle's engine compartment. Still another object of the present invention is to provide a water management system for a vehicle engine compartment vent that is easy to use, retrofittable on existing vehicles, and cost-effective.

SUMMARY OF THE INVENTION

A vehicle is disclosed that includes an engine compartment and a hood covering the engine compartment. The hood is formed with at least one vent hole. A fender is located adjacent the hood, and the fender is formed with a trough. As intended by the present invention, a water tray is positioned under the vent hole of the hood and is engaged with the hood. The water tray includes an open edge juxtaposed with the trough and at least one wall inboard of the open edge and vertically spaced from the hood. Consequently, gas from the engine compartment can flow over the wall and out of the vent holes, and water flowing into the vent holes is substantially blocked by the wall from flowing into the engine compartment.

In another aspect, a water management system is disclosed for a vehicle that has an engine compartment and a hood for covering the engine compartment. The hood defines at least one vent hole, and the water management system includes a set of louvers that are configured to be mountable on the hood. Further, a gasket is positioned below the louvers and is engaged therewith. As disclosed in detail below, the gasket is formed with at least one gasket hole, and the gasket hole is aligned with the vent hole when the system is engaged with the vehicle. A water tray is positionable below the hood and is engageable with the louvers such that a pathway for gas communication is established from the engine compartment, between the water tray and hood, through the holes and out of the louvers. Importantly, the water tray substantially prevents water that seeps into the louvers from traversing the pathway for gas communication into the engine compartment.

In a preferred embodiment the gasket is formed with plural gasket holes, with each gasket hole being engageable with a respective vent hole in the hood. Each gasket hole is circumscribed by a respective down-turned flange that is receivable in the respective vent hole. Additionally, the water tray is formed with a high vertical barrier and a low vertical barrier. The barriers prevent water from flowing into the vehicle's engine compartment, and the barriers are configured such that the high barrier is inboard of the low barrier.

In the preferred embodiment, the louvers are established by a louver cover, and the louver cover is formed with at least one projection for engaging a respective guide hole in the gasket such that the projections hold the gasket against the louver cover. Additionally, plural fasteners extend downwardly from the louver cover, and hollow rigid fastener supports are formed on the water tray and extend upwardly toward the hood, with each fastener being received in a respective fastener support. Plural holders are engageable with the fasteners to hold the fasteners in the respective fastener supports.

In yet another aspect, in a vehicle having a hood covering an engine compartment, plural vent holes formed in the hood, plural fastener holes formed in the hood, and a fender trough juxtaposed with the engine compartment, a water management device is disclosed which includes a louvered cover including cover fasteners protruding from a bottom side thereof. Also, a gasket is formed with gasket holes and each gasket hole is configured and positioned to be aligned with one of the vent holes. Furthermore, the gasket is formed with fastener holes for receiving the cover fasteners therethrough. The louvered cover is positionable over the hood with the gasket sandwiched between the louvered cover and hood, with the gasket holes of the gasket juxtaposable with the vent holes, and with the cover fasteners protruding through the fastener holes.

A water tray is positionable under the hood. Per the present invention, the water tray includes fastener supports that are configured for receiving respective cover fasteners. The water tray is formed with a continuous surface and at least one wall extending along a predetermined portion of the surface, with a preselected portion of the surface having no wall and with the preselected portion being contiguous to the fender trough. With this combination of structure, gas from the engine compartment can pass over the wall and through the holes and the louvered cover. In contrast, water that passes through the louvered cover and holes can flow only past the preselected portion into the fender trough, because the wall blocks the water from flowing past the predetermined portion into the engine compartment.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a cross-sectional view as seen along the line 3—3 in FIG. 1.

DETAILED DESCRIPTION OF THE PREFERRED EMBODIMENT

Figure 1:
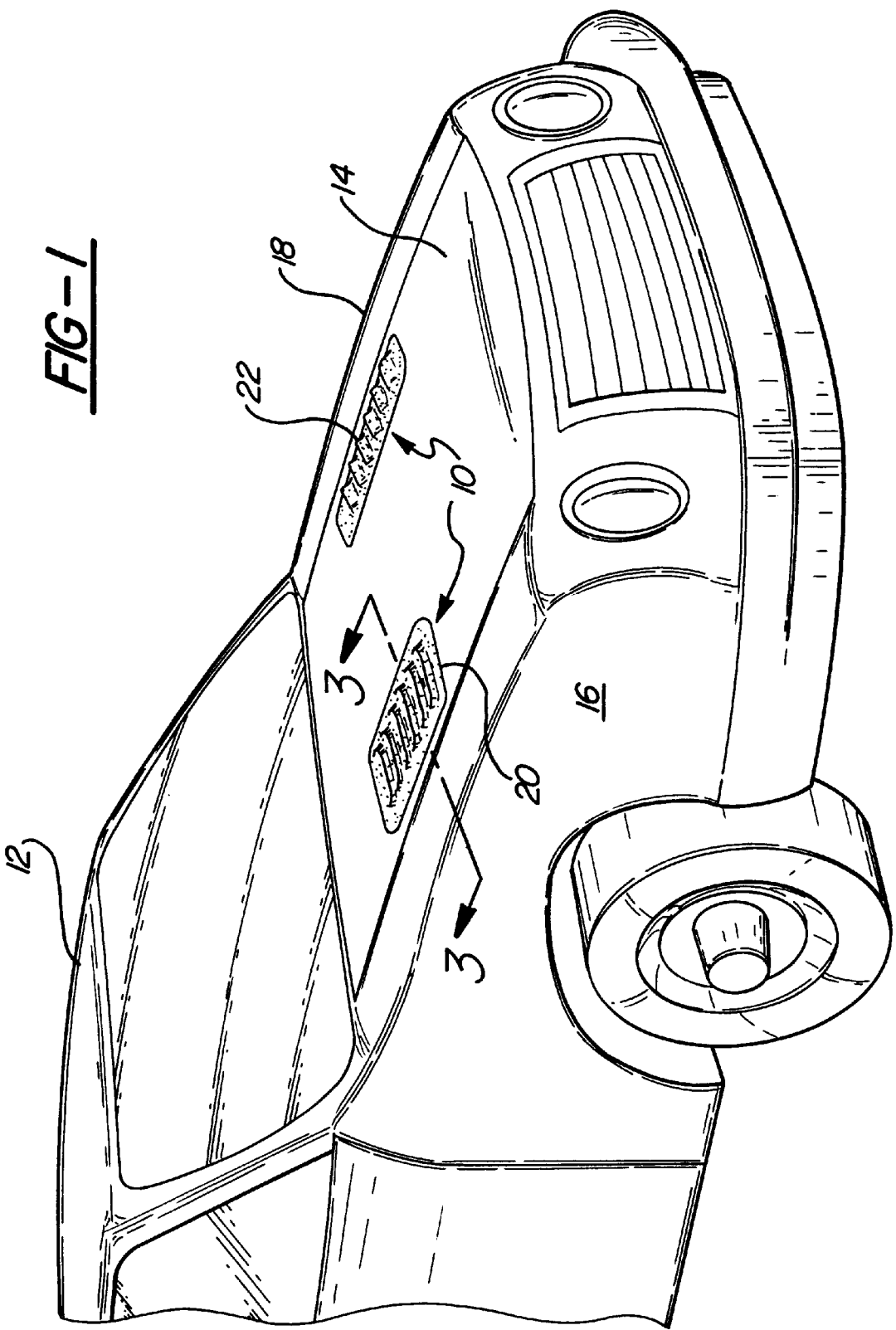
FIG. 1 is a cut-away perspective view of a vehicle incorporating the present water management system.

Referring initially to FIG. 1, a water management system is shown, generally designated 10, for venting air from an engine compartment of a vehicle 12 having an engine compartment hood 14 and right and left fenders 16, 18. Relative orientations are accordingly referenced herein to the vehicle 12.

As shown, the system 10 includes right and left subsystems having respective right and left louver covers 20, 22, with the louver covers 20, 22 being mounted on the hood 14 near a respective right or left fender 16, 18. Per the present invention, the left and right subsystems are mirror images of each other, and are otherwise identical in configuration and operation to each other. With this understanding, for disclosure purposes only the right subsystem including the right louver cover 20 will be disclosed below.

Figure 2:
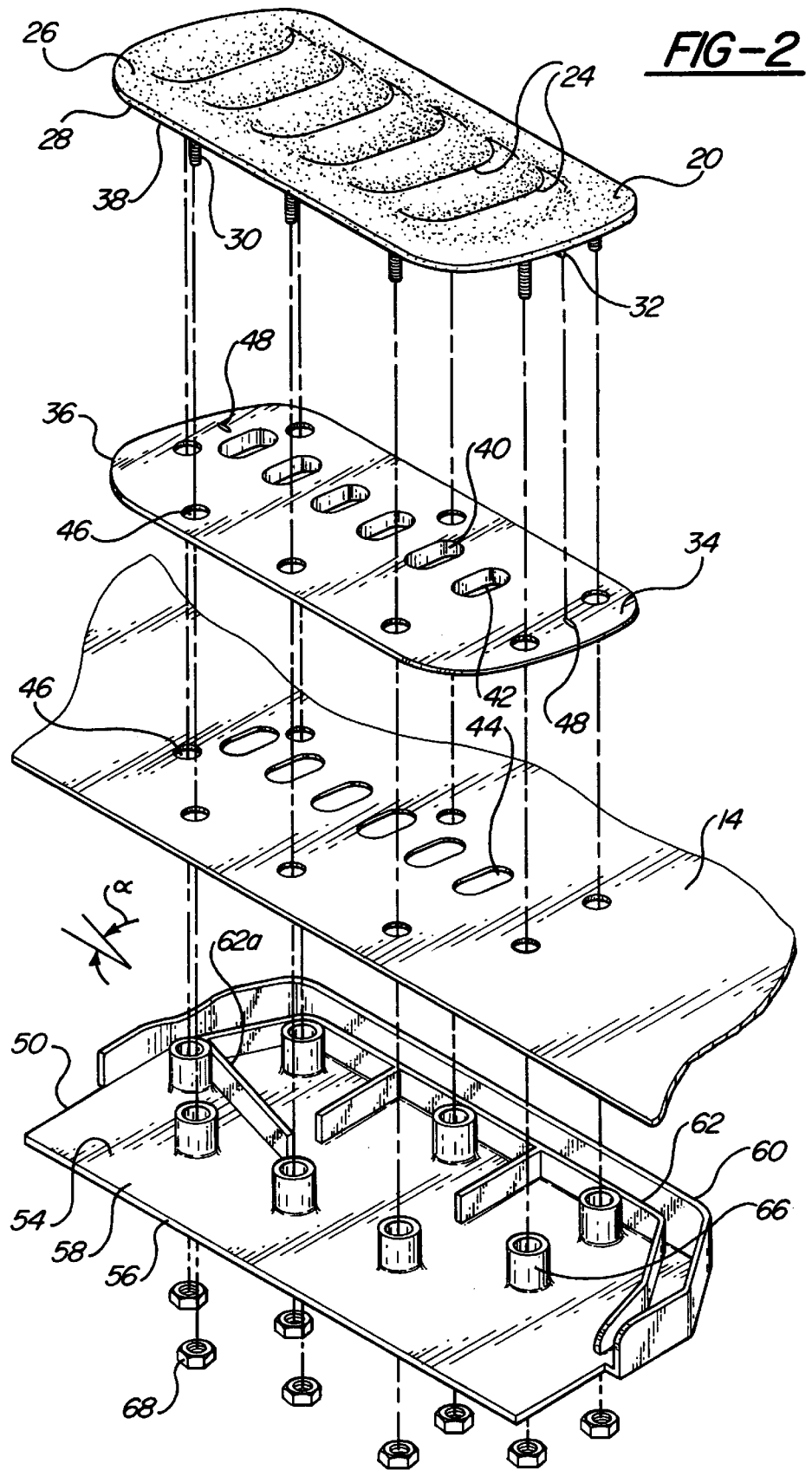
FIG. 2 is an exploded perspective view of the present water management system.

The details of the system 10 can be seen in reference to FIGS. 2 and 3. As shown, the louver cover 20 is made of a unitarily molded hard rigid plastic material that is formed with a set of transversely-oriented louvers 24. Each louver 24 establishes a tortuous path for fluid communication between a top surface 26 of the louver cover 20 and a bottom surface 28 of the louver cover 20.

As best shown in FIG. 2, plural fasteners, preferably elongated externally threaded metal louver bolts 30, are attached. to and protrude downwardly from the louver cover 20. Further, two opposed plastic guide projections (only a single projection 32 is shown) protrude downwardly from the louver cover 20, one near the front of the louver cover 20 and one near the rear. Preferably, the guide projections 32 are formed with cruciform-shaped transverse cross-sections.

With continued reference to FIGS. 2 and 3, beneath the louver cover 20, a flat sealing gasket 34 is disposed that has a periphery 36, the contour of which is substantially identical to the contour of the periphery 38 of the louver cover 20. The gasket 34 is sandwiched between the louver cover 20 and the hood 14.

Per the present invention, each gasket 34 is formed with plural oblong gasket holes 40, with each gasket hole 40 being positioned generally beneath a respective louver 24. A respective down-turned flange 42 circumscribes each of the gasket holes 40 to direct water through corresponding vent holes 44 in the hood 14. In other words, the flanges 42 are contoured substantially identically to the vent holes 44, and each flange 42 is closely received in a respective vent hole 44.

Additionally, the gasket 34 and hood 14 are formed with circular fastener holes 46, with a fastener hole in the gasket being aligned with a respective fastener hole in the hood 14 as shown to receive a respective bolt 30 therethrough. Moreover, the gasket 34 is formed with one circular and one oblong register hole 48 as shown. It is to be understood that the projections 32 are received in respective register holes 48, such that the gasket 34 is held in registration with the louver cover 20.

As shown in FIGS. 2 and 3, a plastic water tray 50 is positioned beneath the hood 14 and is engaged with the louver cover 20. In accordance with the present invention, a pathway 52 for gas communication is established from the engine compartment, between the water tray 50 and hood 14, through the vent and gasket holes 44, 40, and out of the louvers 24, while the water tray 50 substantially prevents water that seeps into the louvers 24 from traversing the pathway 52 for gas communication into the engine compartment.

More particularly, the water tray 50 is formed with a flat bottom surface 54, an open edge 56 bounding an outboard portion 58 of the water tray 50, and at least one barrier. Preferably, the water tray 50 is formed with inboard and outboard long curved barrier walls or ridges 60, 62, with both walls or ridges 60, 62 being inboard of the open edge 56 and with the open edge 56 being contiguous to a fender trough as set forth further below.

As shown, the inboard wall or ridge 60 follows the contour of the edges of the water tray 50, except for the open outboard edge 56. Also, the outboard edge 62 parallels the inboard edge 60 and is spaced therefrom. Moreover, the top edge of each wall or ridge 60, 62 is vertically spaced from the hood 14 as shown, to establish the pathway 52 for gas communication.

FIGS. 2 and 3 show that the inboard wall or ridge 60, which rises higher from the bottom surface 54 than does the outboard wall or ridge 62, extends about three-quarters of the way around the sides of the water tray 50. A rear segment 62a of the outboard wall or ridge 62 (i.e., the segment facing the front of the vehicle 12) also turns toward the front of the vehicle at an angle α relative to the open edge 56 of about twenty two degrees (22°).

In accordance with the present invention, the holes 40, 44. of the gasket 34 and hood 14 are transversely intermediate the open edge 56 and the barrier walls 60, 62. Likewise, the fastener holes 46 are transversely intermediate the open edge 565 and the barrier walls 60, 62. Accordingly, the walls or ridges 60, 62 with segment 62a can direct water flowing from the holes 40, 44, or 46 to the water tray 50 into a fender trough 64 (FIG. 3). It may now be fully understood that the trough 64 is formed in the fender 16 of the vehicle 12, and that the system 10I is positioned on the vehicle 12 with the open edge 56 contiguous to the trough 64. Both of the partitions that are established by the walls or ridges 60, 62 are intended to prevent moisture in the water tray (as can seep through the louvers 24 and gasket holes 40) from flowing into the engine compartment, while still allowing hot air from the engine to exit from the engine compartment via the pathway 52 for gas communication. As intended by the present invention, water passing over the lower outboard ridge 62 will be stopped by the higher inboard ridge 60; and water between the two ridges 60, 62 will flow back into the central area of the water tray 50, and from there past the open edge 56 and into the fender trough 64.

Continuing with the description of FIGS. 2 and 3, hollow rigid fastener supports 66 are formed on the water tray 50, and the supports 66 extend upwardly from the bottom surface 54. The inside surface of each support 66 is circumscribed by a respective support flange 67 (FIG. 3). As shown, each bolt 32 is received in a respective fastener support 66, and the heads of the bolts 32 abut the respective support flanges 67 while the shanks of the bolts 32 extend downwardly through the flanges 67. Internally threaded nuts 68 abut the support flanges 67 and engage the bolts 32 to thereby join the various component parts of the invention together and to the hood 14.

While the particular VEHICLE HOOD LOUVERS WATER MANAGEMENT SYSTEM as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A water management system for a vehicle having an engine compartment and a hood for covering the engine compartment, the hood defining at least one vent hole, comprising:

a plurality of louvers, configured to be mountable on the hood;

a gasket positioned below each louver, the gasket being formed with at least one gasket hole, the at least one gasket hole being aligned with the at least one vent hole when the system is engaged with the vehicle;

a water tray positionable below the hood and engageable with the louvers such that a pathway for gas communication is established from the engine compartment, between the water tray and hood, through the holes and out of the louvers, wherein the water tray substantially prevents water that seeps into the louvers from traversing the pathway for gas communication into the engine compartment; and, wherein the gasket is formed with plural gasket holes, each gasket hole being circumscribed by a respective down-turned flange receivable in a respective vent hole.

2. A water management system for a vehicle having an engine compartment and a hood for covering the engine compartment, the hood defining at least one vent hole, comprising:

a plurality of louvers, configured to be mountable on the hood;

a gasket positioned below each louver, the casket being formed with at least one gasket hole, the at least one gasket hole being aligned with the at least one vent hole when the system is engaged with the vehicle;

a water tray positionable below the hood and engageable with the louvers such that a pathway for gas communication is established from the engine compartment, between the water tray and hood, through the holes and out of the louvers, wherein the water tray substantially prevents water that seeps into the louvers from traversing the pathway for gas communication into the engine compartment; and, wherein the water tray is formed with a high vertical barrier and a low vertical barrier, the barriers preventing water from flowing from the louvers into the vehicle's engine compartment, the barriers being configured such that the high barrier is inboard of the low barrier.

3. A water management system for a vehicle having an engine compartment and a hood for covering the engine compartment, the hood defining at least one vent hole, comprising:

a plurality of louvers, configured to be mountable on the hood;

a gasket positioned below each louver, the gasket being formed with at least one gasket hole, the at least one gasket hole being aligned with the at least one vent hole when the system is engaged with the vehicle;

a water tray positionable below the hood and engageable with the louvers such that a pathway for gas communication is established from the engine compartment, between the water tray and hood, through the holes and out of the louvers, wherein the water tray substantially prevents water that seeps into the louvers from traversing the pathway for gas communication into the engine compartment; and, wherein the vehicle defines a fender trough and the water tray includes a flat bottom surface defining an outboard edge juxtaposable with the fender trough, the water tray also including at least one barrier wall inboard of the edge and distanced from the hood, the holes of the gasket and hood being transversely intermediate the barrier wall and edge, such that air from the engine compartment can flow between the barrier wall and the hood and out of the holes and such that water seeping through the holes onto the bottom surface of the water tray is substantially directed past the outboard edge of the tray into the fender trough.

4. A water management system for a vehicle having an engine compartment and a hood for covering the engine compartment, the hood defining at least one vent hole, comprising:

a plurality of louvers, configured to be mountable on the hood;

a gasket positioned below each louver, the gasket being formed with at least one gasket hole, the at least one gasket hole being aligned with the at least one vent hole when the system is engaged with the vehicle;

a water tray positionable below the hood and engageable with the louvers such that a pathway for gas communication is established from the engine compartment, between the water tray and hood, through the holes and out of the louvers, wherein the water tray substantially prevents water that seeps into the louvers from traversing the pathway for gas communication into the engine compartment; and, wherein the louvers are established by a louver cover, and the louver cover is formed with at least one projection for engaging a respective guide hole in the gasket.

5. A water management system for a vehicle having an engine compartment and a hood for covering the engine compartment, the hood defining at least one vent hole, comprising:

a plurality of louvers, configured to be mountable on the hood;

a gasket positioned below each louver, the gasket being formed with at least one gasket hole, the at least one gasket hole being aligned with the at least one vent hole when the system is engaged with the vehicle;

a water tray positionable below the hood and engageable with the louvers such that a pathway for gas communication is established from the engine compartment, between the water tray and hood, through the holes and out of the louvers, wherein the water tray substantially prevents water that seeps into the louvers from traversing the pathway for gas communication into the engine compartment; and, wherein the louvers are established by a louver cover, and the system further comprises:

plural fasteners extending downwardly from the louver cover;

hollow rigid fastener supports formed on the water tray and extending upwardly toward the hood, each fastener being received in a respective fastener support; and plural holders engageable with the fasteners to hold the fasteners in the respective fastener supports.

6. In a vehicle having a hood covering an engine compartment, plural vent holes formed in the hood, plural fastener holes formed in the hood, and a fender trough juxtaposed with the engine compartment, a water management device, comprising:

a louvered cover including cover fasteners protruding from a bottom side thereof;

a gasket formed with gasket holes, each gasket hole being configured and positioned to be aligned with one of the vent holes, the gasket also being formed with fastener holes for receiving the cover fasteners therethrough, wherein the louvered cover is positionable over the hood with the gasket sandwiched between the louvered cover and hood with the gasket holes of the gasket juxtaposable with the vent holes and the cover fasteners protruding through the fastener holes; and a water tray positionable under the hood, the water tray including fastener supports configured for receiving respective cover fasteners, the water tray being formed with a continuous surface and at least one wall extending along a predetermined portion of the surface, a preselected portion of the surface having no wall, the preselected portion being contiguous to the fender trough, wherein gas from the engine compartment can pass over the wall and through the holes and the louvered cover, and wherein water that passes through the louvered cover and holes can flow only past the preselected portion into the fender trough, the wall blocking the water from flowing past the predetermined portion into the engine compartment.

7. The device of claim 6, further comprising the vehicle.

8. The combination of claim 7, wherein each gasket hole is circumscribed by a respective flange, the flange being engageable with the respective vent hole in the hood.

9. The device of claim 6, wherein the water tray is formed with a high wall and a low wall, the walls preventing water from flowing into a vehicle's engine compartment, the walls being configured such that the high wall is inboard of the low wall.

10. The device of claim 6, wherein the louver cover is formed with at least one projection for engaging a respective guide hole in the gasket.

11. The device of claim 6, further comprising:

plural holders engageable with the fasteners to hold the fasteners in the respective fastener supports.

12. A vehicle, comprising:

an engine compartment;

a hood covering the engine compartment, the hood being formed with at least one vent hole;

a fender adjacent the hood, the fender being formed with a trough;

a water tray positioned under the hood, the water tray including an open edge juxtaposed with the trough and at least one wall inboard of the open edge and vertically spaced from the hood, such that gas from the engine compartment can flow over the wall and out of the vent holes, and water flowing into the vent holes is substantially blocked by the wall from flowing into the engine compartment;

a louvered cover including cover fasteners protuding from a bottom side thereof; and, a gasket formed with at least one gasket hole, the at least one gasket hole being configured and positioned to be aligned with the at least one vent hole, the gasket also being formed with fastener holes for receiving the cover fasteners therethrough, wherein the louvered cover is positionable over the hood with the gasket sandwiched between the louvered cover and hood and with the gasket hole of the gasket juxtaposed with a respective vent hole and the cover fasteners protuding through the fastener holes.

13. The vehicle of claim 12, further comprising plural gasket holes and plural vent holes, wherein each gasket hole is circumscribed by a respective flange, the flange being engageable with the respective vent hole in the hood.

14. The vehicle of claim 13, wherein the water tray is formed with a high wall and a low wall, the walls preventing water from flowing into a vehicle's engine compartment, the wall being configured such that the high wall is inboard of the low wall.

15. The vehicle of claim 14, wherein the louver cover is formed with at least one projection for engaging a respective guide hole in the gasket such that the projections hold the gasket against the louver cover.

16. The vehicle of claim 15, further comprising:

plural holders engageable with the fasteners to hold the fasteners in the respective fastener supports.

* * * * *